United States Patent
Weinberger et al.

(10) Patent No.: US 7,251,737 B2
(45) Date of Patent: Jul. 31, 2007

(54) CONVERGENCE DEVICE WITH DYNAMIC PROGRAM THROTTLING THAT REPLACES NONCRITICAL PROGRAMS WITH ALTERNATE CAPACITY PROGRAMS BASED ON POWER INDICATOR

(75) Inventors: Guenter Weinberger, White Plains, NY (US); C. John Glossner, Carmel, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 459 days.

(21) Appl. No.: 10/699,022

(22) Filed: Oct. 31, 2003

(65) Prior Publication Data

US 2005/0097376 A1   May 5, 2005

(51) Int. Cl.
*G06F 1/32* (2006.01)
(52) U.S. Cl. ............ 713/320; 455/343.5; 455/574
(58) Field of Classification Search ......... 455/343.5, 455/574; 713/320
See application file for complete search history.

(56) References Cited

U.S. PATENT DOCUMENTS

| | | | |
|---|---|---|---|
| 5,701,337 A | 12/1997 | Silver et al. | |
| 5,719,800 A | 2/1998 | Mittal et al. | |
| 6,408,196 B2 * | 6/2002 | Sheynblat et al. | 455/574 |
| 6,415,388 B1 * | 7/2002 | Browning et al. | 713/322 |
| 6,501,968 B1 * | 12/2002 | Ichimura | 455/574 |
| 6,574,740 B1 | 6/2003 | Odaohhara et al. | |
| 6,697,953 B1 * | 2/2004 | Collins | 713/320 |
| 6,735,455 B2 * | 5/2004 | Naito et al. | 455/574 |
| 6,947,775 B2 * | 9/2005 | Okamoto et al. | 455/574 |
| 6,948,082 B2 * | 9/2005 | Gschwind et al. | 713/320 |

(Continued)

FOREIGN PATENT DOCUMENTS

JP    2001-352396    12/2001

(Continued)

OTHER PUBLICATIONS

J. Glossner et al., "A Software Defined Communications Baseband Design," IEEE Communications Magazine, vol. 41, No. 1, 10 pages, Jan. 2003.

(Continued)

*Primary Examiner*—Chun Cao
*Assistant Examiner*—Albert Wang
(74) *Attorney, Agent, or Firm*—Barnes & Thornburg LLP

(57) ABSTRACT

Techniques for conserving power by controlling program execution in a convergence device comprising a battery or other power source and at least one processor. The processor is configured to perform processing operations associated with voice call communication functions and to perform processing operations associated with data communication functions, and is operative to execute critical programs and noncritical programs. The convergence device stores, for at least a given one of a plurality of noncritical programs associated with the data communication functions, an identifier of at least one alternate capacity program capable of performing substantially the same function as the given program but having a different power source capacity associated therewith. Based at least in part on a power indicator representative of remaining capacity or another characteristic of the power source, execution of the given program may be replaced with execution of the alternate capacity program, such that an amount of power source capacity utilizable for the voice call communication functions is increased.

19 Claims, 3 Drawing Sheets

U.S. PATENT DOCUMENTS

| | | |
|---|---|---|
| 2002/0025839 A1 | 2/2002 | Usui |
| 2002/0047797 A1 | 4/2002 | Mercke et al. |
| 2003/0159024 A1 | 8/2003 | Chen |
| 2003/0188210 A1 | 10/2003 | Nakazato |

FOREIGN PATENT DOCUMENTS

| | | |
|---|---|---|
| JP | 2002-064596 | 2/2002 |
| JP | 2002-176493 | 6/2002 |
| JP | 2002-353846 | 12/2002 |

OTHER PUBLICATIONS

J. Glossner et al., "Multi-Threaded Processor for Software-Defined Radio," Proceedings of the 2002 Software Defined Radio Technical Conference, vol. 1, 6 pages, Nov. 11-12, 2002.

\* cited by examiner

CONVERGENCE DEVICE WITH DYNAMIC PROGRAM THROTTLING THAT REPLACES NONCRITICAL PROGRAMS WITH ALTERNATE CAPACITY PROGRAMS BASED ON POWER INDICATOR

FIELD OF THE INVENTION

The present invention relates generally to processor-based communication devices, and more particularly to convergence devices, which may include communication devices configured for processing of voice, data, audio, video and other information communicated over a variety of different media.

BACKGROUND OF THE INVENTION

A convergence device typically incorporates a variety of different communication and multimedia data processing functions. One example of such a device is a so-called "smart" telephone, which generally comprises a processor capable of running multimedia application programs or other programs associated with data communication functions, as well as programs associated with cellular voice call communication functions. A given smart telephone may be configured, by way of example, to allow a user to retrieve e-mail, browse the Internet, manage personal information, and utilize text messaging, while also providing support for traditional cellular telephone voice calls.

A more particular example of a convergence device of this type is a wireless mobile unit of a recently-developed high-speed CDMA communication system such as the 3rd Generation Partnership Project (3GPP) Wideband CDMA (WCDMA) system, described in 3GPP Technical Specifications TS 25.1xx, which are incorporated by reference herein. The convergence device may include, in addition to or in place of cellular communication functionality, wireless networking functionality in accordance with the IEEE 802.11 standards, which are incorporated by reference herein, or other suitable wireless networking standards.

Convergence devices often require execution of a number of different types of code, including digital signal processor (DSP) code associated with signal processing operations as well as high-level program application code written in Java or another object-oriented programming language.

Multithreaded processors particularly well-suited for use in convergence devices are described in U.S. patent application Ser. No. 10/269,372, filed Oct. 11, 2002 and entitled "Multithreaded Processor With Efficient Processing For Convergence Device Applications," which is commonly assigned herewith and incorporated by reference herein. An illustrative embodiment of a multithreaded processor as described in U.S. patent application Ser. No. 10/269,372 is capable of executing RISC-based control code, DSP code, Java code and network processing code. This processor includes a single instruction multiple data (SIMD) vector unit, a reduction unit, and long instruction word (LIW) compounded instruction execution.

Convergence devices are typically configured to operate on battery power. It is usually desirable in such devices to maintain a certain minimum voice call communication capability as the battery capacity decreases. Generally, processing associated with data communication functions, such as multimedia application processing, requires significantly more computational capacity, and thus expends more battery power, than cellular voice call communication.

Unfortunately, conventional power conservation techniques are not designed to accommodate the particular configuration and functionality of convergence devices, and thus fail to provide optimal performance in such devices. Accordingly, a need exists for improved power conservation techniques for use in convergence devices.

SUMMARY OF THE INVENTION

The present invention provides improved techniques for conserving power from a battery or other power source in a processor-based convergence device.

In accordance with one aspect of the invention, techniques are provided for conserving power by controlling program execution in a convergence device comprising a battery or other power source and at least one processor. The processor may comprise a multithreaded processor or other type of processor. The processor is configured to perform processing operations associated with voice call communication functions and to perform processing operations associated with data communication functions, and is operative to execute critical programs and noncritical programs.

The critical programs may comprise, for example, programs utilized to implement at least one of an operating system running on the processor, a graphical user interface of the convergence device, and one or more of the voice call communication functions.

The noncritical programs are preferably categorized based on power source capacity into at least two categories including a category at a first capacity and a category at a second capacity, the first capacity being a lower capacity than the second capacity. Each of at least a subset of the plurality of noncritical programs may be in one of a number of states, including at least an executing state, a pending state and a sleeping state.

In operation, the convergence device stores, for at least a given one of a plurality of noncritical programs associated with the data communication functions, an identifier of at least one alternate capacity program capable of performing substantially the same function as the given program but having a different power source capacity associated therewith. Based at least in part on a power indicator representative of remaining capacity or another characteristic of the power source, execution of the given program may be replaced with execution of the alternate capacity program, such that an amount of power source capacity utilizable for the voice call communication functions is increased. For example, if the power indicator is below a first threshold, execution of the given noncritical program is replaced with execution of an alternate capacity noncritical program having associated therewith a lower power source capacity than the given program. Similarly, if the power indicator is not below the first threshold, execution of the given noncritical program is replaced with execution of an alternate capacity program having associated therewith a higher power source capacity than the given program.

In an illustrative embodiment, the data communication functions may comprise one or more functions associated with multimedia processing at one or more of a specified data rate, a specified refresh rate and a specified display resolution. The given program may perform multimedia processing at a specified data rate, refresh rate or display resolution, and in this case the alternate capacity program, performing substantially the same function as the given program, may perform multimedia processing at a different data rate, refresh rate or display resolution than the given program.

In accordance with another aspect of the invention, if the power indicator is below a second threshold that is lower than the first threshold, the given noncritical program and the alternate noncritical program may each be set to a sleeping status. Alternatively, if the power indicator is not below the second threshold, any noncritical program having a sleeping status may be set to a pending status. The second threshold may be representative of a minimum acceptable capacity for continuation of one or more of the voice call communication functions.

Advantageously, the techniques of the invention can substantially increase the period of time for which a convergence device provides voice call communication functions for a given battery capacity level.

DETAILED DESCRIPTION OF THE INVENTION

The present invention will be illustrated herein as implemented in an example convergence device configured to include a multithreaded processor. It should be understood, however, that the invention does not require the use of the particular convergence device and multithreaded processor of the illustrative embodiment, and is more generally suitable for use in any processor-based convergence device in which it is desirable to provide improved conservation of battery power or other type of power. The term "convergence device" as used herein is intended to include without limitation a mobile telephone, a personal digital assistant (PDA), a portable computer, or other type of processor-based communication device having both voice call communication and data communication functions associated therewith.

Figure 1:
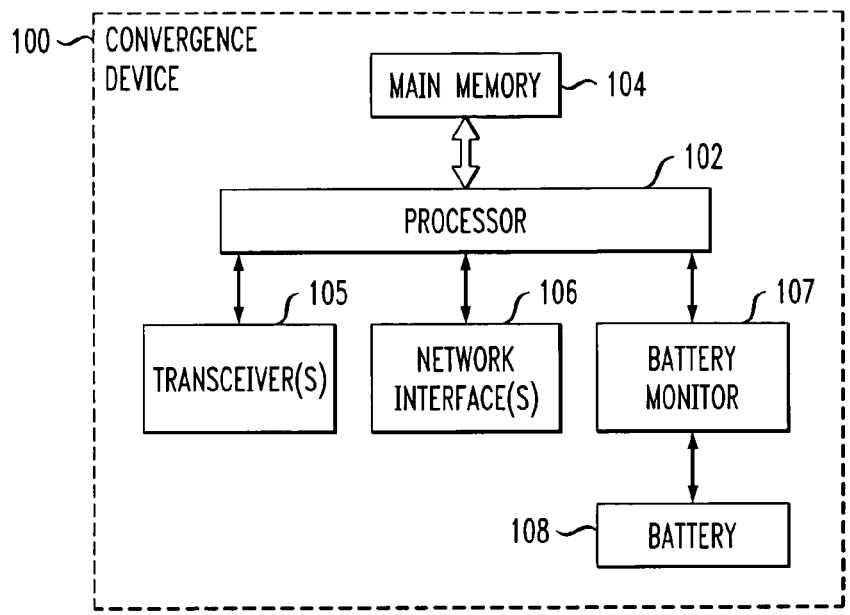
FIG. 1 is a block diagram of an example processor-based convergence device in which the invention is implemented.

FIG. 1 shows a convergence device 100 in accordance with the illustrative embodiment of the invention. The convergence device includes a processor 102 coupled to a main memory 104. Also coupled to the processor 102 are one or more transceivers 105, one or more network interfaces 106, and a battery monitor 107 which monitors the capacity of a battery 108.

The transceiver(s) 105 may be associated, by way of example, with a cellular communication function, such as a WCDMA communication function, or other type of voice call communication function implemented in the convergence device. The network interface(s) 106 may be associated, again by way of example, with a wireless networking function, such as an IEEE 802.11 wireless networking function, or other type of data communication function implemented in the convergence device.

The battery monitor 107 and battery 108 may be entirely conventional in design, and numerous possible implementations of such elements will be readily apparent to those skilled in the art. Generally, the battery monitor 107 generates at least one battery indicator signal, also referred to as a battery indicator, which may indicate a percentage of battery capacity remaining, or other type of remaining power level or other capacity level of the battery 108. The battery indicator is an example of what is more generally referred to herein as a power indicator. The invention does not require the use of any particular type of power indicator, and can be configured in a straightforward manner to operate with any of a wide variety of such indicators that are known to those skilled in the art. Also, the invention can be used with power sources other than batteries.

The convergence device 100 may be configured to utilize software defined radio (SDR) techniques, as described in, for example, J. Glossner, D. Iancu, J. Lu, E. Hokenek, and M. Moudgill, "A Software Defined Communications Baseband Design," IEEE Communications Magazine, Vol. 41, No. 1, pages 120-128, January, 2003, and J. Glossner, E. Hokenek, and M. Moudgill, "Multithreaded Processor for Software Defined Radio," Proceedings of the 2002 Software Defined Radio Technical Conference, Volume I, pp. 195-199, Nov. 11-12, 2002, San Diego, Calif., which are incorporated by reference herein.

An exemplary integrated circuit product implementing the SDR techniques described in the above-cited references is the SB9600™ baseband processor from Sandbridge Technologies, Inc. of White Plains, New York, USA.

Figure 2:
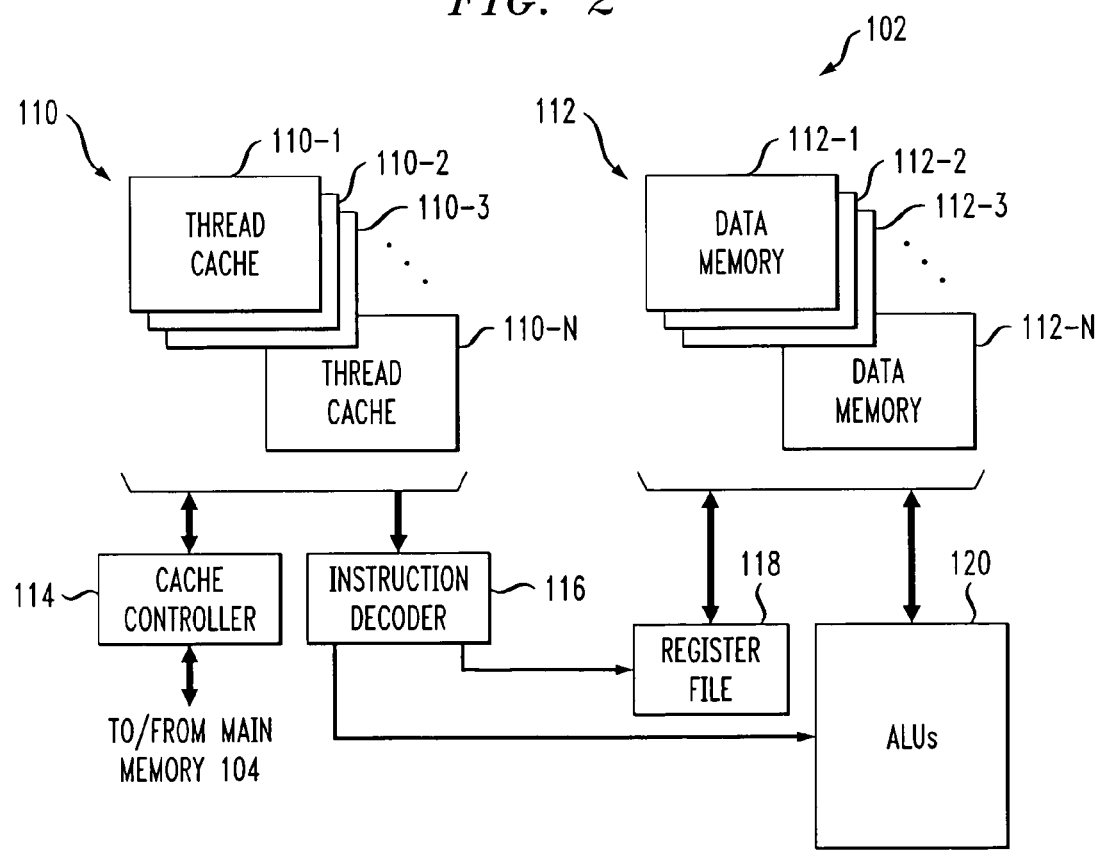
FIG. 2 is a more detailed block diagram of an illustrative embodiment of a multithreaded processor of the FIG. 1 convergence device.

FIG. 2 shows a more detailed view of one possible implementation of the processor 102. In this example, the processor 102 is implemented as a multithreaded processor, although as indicated above the use of a multithreaded processor is not a requirement of the invention. The multithreaded processor includes a multithreaded cache memory 110, a data memory 112, a cache controller 114, an instruction decoder 116, a register file 118, and a set of arithmetic logic units (ALUs) 120. The multithreaded cache memory 110 is also referred to herein as a multithreaded cache.

The multithreaded cache 110 includes a plurality of thread caches 110-1, 110-2, . . . 110-N, where N generally denotes the number of threads supported by the multithreaded processor 102. Each thread thus has a corresponding thread cache associated therewith in the multithreaded cache 110. Similarly, the data memory 112 includes N distinct data memory instances, denoted data memories 112-1, 112-2, . . . 112-N as shown.

Each of the thread caches in the multithreaded cache 110 may comprise a memory array having one or more sets of memory locations. A given thread cache may further comprise or otherwise have associated therewith a thread identifier register for storing an associated thread identifier.

The multithreaded cache 110 interfaces with the main memory 104 via the cache controller 114. The cache controller 114 ensures that the appropriate instructions from main memory 104 are loaded into the multithreaded cache 110. The cache controller 114 in this illustrative embodiment, operating in conjunction with logic circuitry or other processing elements associated with the individual thread caches 110-1, 110-2, . . . 110-N, may implement at least a portion of an address mapping technique, such as fully associative mapping, direct mapping or set-associative mapping.

Illustrative set-associative mapping techniques suitable for use in conjunction with the present invention are described in U.S. patent application Ser. Nos. 10/161,774 and 10/161,874, both filed Jun. 4, 2002 and commonly assigned with the present application, and both of which are incorporated by reference herein.

In general, the multithreaded cache 110 is used to store instructions to be executed by the multithreaded processor 102, while the data memory 112 stores data that is operated on by the instructions. Instructions are fetched from the multithreaded cache 110 by the instruction decoder 116 which operates in conjunction with the register file 118 and the ALUs 120 in controlling the execution of the instructions in a conventional manner. The operation of multithreaded processor elements such as 116, 118 and 120 is well understood in the art, and therefore not described in further detail herein.

The data memory 112 is typically directly connected to the main memory 104, although this connection is not explicitly shown in the figure.

One or more of the memories 104, 110 and 112 may each be configured so as to include multiple banks or other designated portions. By way of example, each bank may be viewed as being made up of one or more memory modules, or a specified portion of a single memory module.

Techniques for thread-based banking of these and other memories associated with a multithreaded processor are described in U.S. patent application Ser. No. 10/269,247, filed Oct. 11, 2002 and entitled "Method and Apparatus for Thread-Based Memory Access in a Multithreaded Processor," which is commonly assigned herewith and incorporated by reference herein.

The term "memory" as used herein is intended to be construed broadly so as to encompass an internal or external memory, a cache memory, a data memory, or other arrangement of data storage elements. The invention is not limited to any particular memory type, configuration or application. It should be noted, however, that memories are generally understood in the processor art as being distinct from registers such as those comprising register file 118 in FIG. 2.

Techniques for thread-based access to register files are described in U.S. patent application Ser. No. 10/269,373, filed Oct. 11, 2002 and entitled "Method and Apparatus for Register File Port Reduction in a Multithreaded Processor," which is commonly assigned herewith and incorporated by reference herein.

It should be noted that the particular arrangements shown in FIGS. 1 and 2 are simplified for clarity of illustration, and additional or alternative elements not explicitly shown may be included, as will be apparent to those skilled in the art.

It should also be emphasized that the present invention does not require the particular multithreaded processor configuration shown in FIG. 2. The invention can be implemented in a wide variety of other multithreaded or non-multithreaded processor configurations.

Examples of multithreaded processors of the type shown in FIG. 2 and suitable for use in conjunction with the present invention are described in the above-cited U.S. patent application Ser. No. 10/269,372.

The multithreaded processor 102 may be configured to utilize a threading approach referred to as token triggered threading, or other suitable threading techniques. Pipelining is also preferably used in conjunction with such threading. Examples of threading and pipelining techniques suitable for use with the present invention are described in U.S. patent application Ser. No. 10/269,245, filed Oct. 11, 2002 and entitled "Method and Apparatus for Token Triggered Multithreading," which is commonly assigned herewith and incorporated by reference herein.

In a multithreaded processor, a given thread can generally be viewed in terms of hardware as well as software. The particular processor hardware associated with a given thread is often more particularly referred to as a hardware thread unit or simply a "context." The term "thread" as used herein is intended to include either software or hardware threads, or both.

The present invention in accordance with one aspect thereof provides improved techniques for power conservation in the convergence device 100 of FIG. 1. More specifically, the invention in the illustrative embodiment provides techniques for dynamic program throttling based on the power indicator generated by the battery monitor 107.

As indicated previously herein, it is usually desirable in a convergence device such as device 100 to maintain a certain minimum voice call communication capability as the battery capacity decreases. Also, multimedia application processing or other types of processing associated with data communication require significantly more computational capacity, and thus expend more battery power, than voice call cellular communication.

The techniques of the invention can be used, for example, to ensure that cellular voice call capability is provided for as long a period of time as is possible for a given battery capacity. In such an arrangement, the processor 102 is configured to throttle non-essential programs, thereby prevented such programs from executing, based at least in part on the power indicator.

Figure 3:
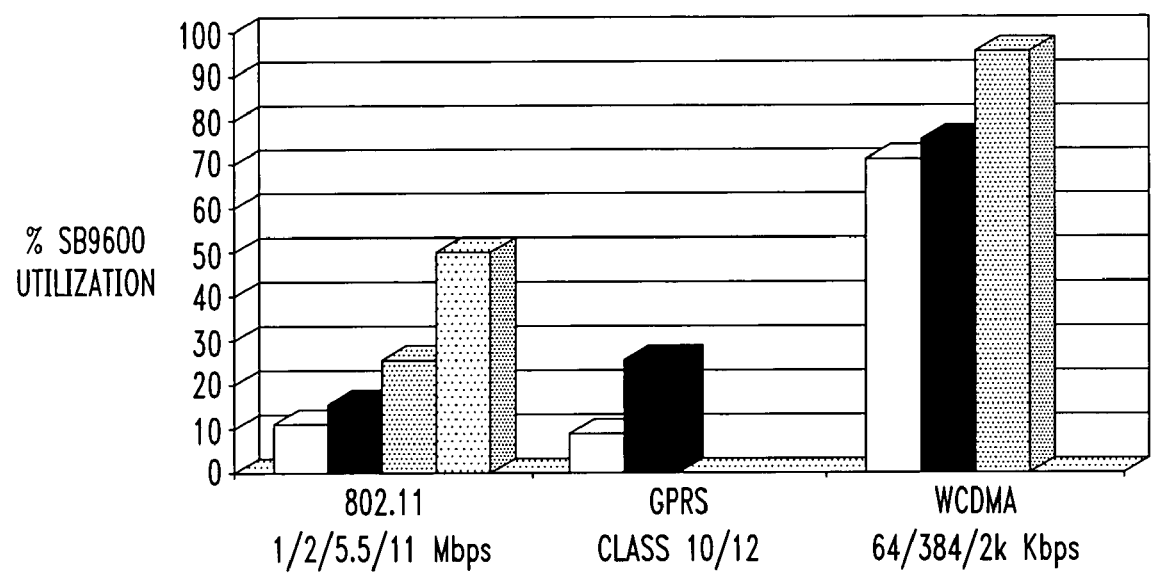
FIG. 3 is a graph illustrating percentage utilization of an example processor for certain communication functions.

FIG. 3 shows a graph illustrating percentage utilization of an example processor for certain data communication functions. In this case, the processor is the above-noted Sandbridge Technologies SB9600™ baseband processor. The processor comprises a plurality of multithreaded processor cores, collectively providing 9.6 billion multiply-accumulate (MAC) operations per second, and can be used to implement the baseband processing associated with a number of different communication protocols.

The graph in the figure shows the percentage utilization of the SB9600™ baseband processor for data communications using each of two cellular protocols, namely WCDMA and general packet radio service (GPRS), and one wireless local area network protocol, namely IEEE 802.11b, at various bit rates. It should be noted that a voice call in either cellular protocol requires less percentage utilization than any of the data communications shown in the graph. This is important because the higher the utilization, the higher the energy dissipation, and the shorter the battery life.

The SB9600™ baseband processor is an example of a processor in which both voice call communication and multimedia data processing or other data communication functions are implemented primarily in software running on multithreaded processor cores.

In a convergence device in which both the voice call communication and data communication operations are implemented in software, it is particularly desirable to be able to control the energy consumed by data communication functions as the critical battery resource is reduced. Advantageously, this enables a minimum functionality of voice call communication capability for some specified amount of time.

As an example, a typical convergence device battery may last eight hours for voice call communications and two hours for data communications when fully charged. If one hour of data communications has taken place, this would also reduce the remaining voice call communication capacity to four hours.

Using the dynamic program throttling techniques of the invention, data communications may be advantageously controlled when the battery capacity falls below a designated level, so as to preserve basic voice communication functionality for a substantially longer period of time than would otherwise be possible.

An exemplary dynamic program throttling technique will now be described with reference to FIG. 4. The figure shows a flow diagram 400 of a dynamic program throttling process in the illustrative embodiment of the invention.

In the following description, it is assumed without limitation that a sequence of instructions executed on the processor 102 comprises a procedure, and that the procedure and the data to which it applies collectively comprise a task. A given procedure or task may be viewed as an example of what is more generally referred to herein as a program. The term "program" as used herein is thus intended to include any set of instructions or other type of code. The convergence device 100 is assumed without limitation to execute tasks associated with voice call communications as well as tasks associated with multimedia processing or other types of processing relating to data communication.

Figure 4:
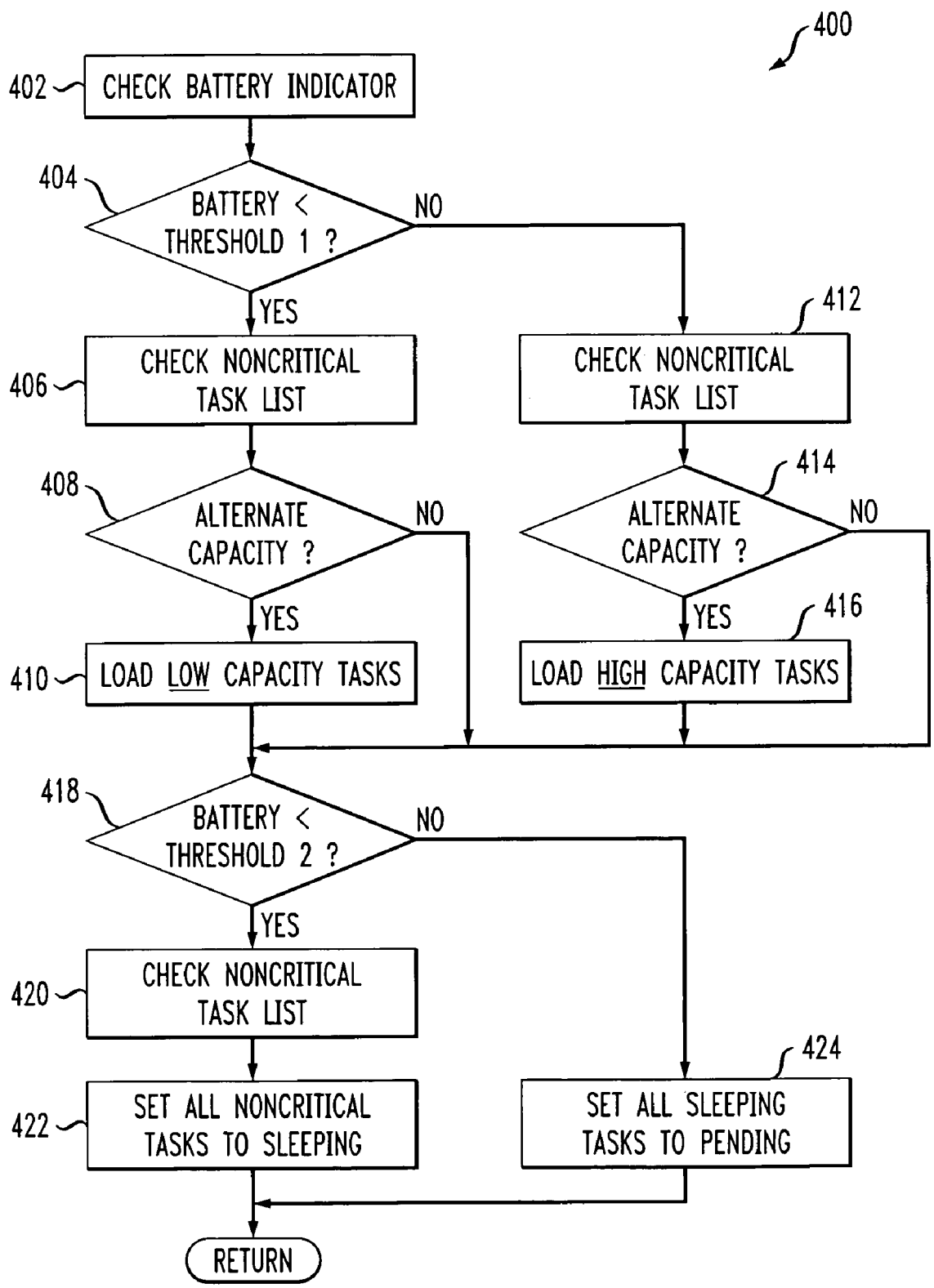
FIG. 4 is a flow diagram of a dynamic program throttling process implemented in the convergence device of FIG. 1 in accordance with the invention.

Generally, prior to execution of the dynamic program throttling process of FIG. 4, tasks are categorized into at least two categories. In this illustrative embodiment, tasks are categorized into two categories, namely critical and noncritical, although other categorizations may be used.

Critical tasks are those that must always run whether or not sufficient battery capacity remains. Examples of critical tasks include the operating system that is executing on the processor 102, the graphical user interface of the convergence device 100, and communications processing tasks related to voice calls.

Noncritical tasks may also be categorized by capacity. One example of a noncritical task is multimedia processing, or other type of processing associated with data communication, which may operate at multiple refresh rates and display resolutions. A more particular example is processing involving MPEG video at 30 frames per second and 640× 480 resolution versus MPEG video at 10 frames per second and 240×180 resolution. Another example is audio in mono or stereo at 64 kbps or 192 kbps. Yet another example is data communications processing which may operate at multiple data rates, such as 802.11b at 1, 2, 5.5 or 11 Mbps. The distinguishing characteristic of these sets of noncritical tasks is that the computational requirements vary with quality or performance but the fundamental software is unchanged except for the capacity required.

A list of noncritical tasks is maintained, in an internal memory of the processor 102, in main memory 104 or elsewhere in the convergence device. A list of critical tasks may also be maintained. Noncritical tasks may be specified as at least low capacity or high capacity, based at least in part on the amount of battery capacity that is consumed by task execution. Other organizations of noncritical tasks into different categories based on capacity may be used.

The term "capacity" as used herein with reference to a given task or other program is intended to include without limitation a capacity utilization of that program, or any other information specifying a capacity-related characteristic of that program. A power source capacity associated with a given program may therefore refer, for example, to an amount of power source capacity that is utilized by that program, to a minimum or optimal amount of power source capacity that is required by that program, or to any other type of capacity label that may be assigned to a capacity category which includes the program.

A given noncritical task may have one of a number of different status settings associated therewith, examples of which may include executing, pending and sleeping. A task in the executing state is active and running on the processor. A task in the pending state is not yet executing, but will be allowed to run as soon as sufficient processor resources become available. A sleeping task is one that is loaded into processor memory but is not allowed to transition to the pending state until the operating system changes its status.

It is to be appreciated, however, that the particular task or program configuration, capacity levels and status settings described in conjunction with FIG. 4 are merely examples, and other arrangements can be used in alternative embodiments.

Referring now to the flow diagram 400, a battery indicator is checked in step 402. As noted above, the battery indicator may specify a percentage of battery capacity remaining, or may be in another suitable format indicative of battery capacity. Generally, if the battery capacity is below a specified threshold, denoted herein as Threshold 1, and an alternate noncritical task exists that fulfills substantially the same function as a currently-executing noncritical task but at a lower capacity, the currently-executing higher-capacity task is replaced by the lower-capacity task. In a similar manner, if the battery capacity is above Threshold 1 and an alternate higher-capacity task exists for a currently-executing lower-capacity task, the lower-capacity task is replaced with the higher-capacity task.

This portion of the dynamic program throttling process is implemented in steps 404 through 416 of the figure. It should be noted that a single executing task can be replaced with multiple alternate capacity tasks, or multiple executing tasks can be replaced with a single alternate capacity task, as appropriate to preserve substantially the same functionality while also conserving battery power.

More specifically, if the battery capacity is determined in step 404 to be less than Threshold 1, then step 406 checks the noncritical task list, step 408 determines if there is any alternate capacity noncritical task or set of tasks which fulfills the same function, and if so step 410 loads the identified low capacity task or tasks from the noncritical task list for execution in place of one or more currently-executing tasks. Similarly, if step 404 indicates that the battery capacity is not less than Threshold 1, then step 412 checks the noncritical task list, step 414 determines if there is any alternate capacity noncritical task or set of tasks which fulfills the same function, and if so step 416 loads the identified high capacity task or tasks from the noncritical task list for execution in place of one or more currently-executing tasks. If it is determined in steps 408 or 414 that there are no alternate capacity tasks that fulfill the functions of currently-executing tasks, respective steps 410 and 416 are bypassed and the process moves to step 418. Otherwise, the process moves to step 418 after execution of step 410 or step 416.

As indicated above, only a single threshold, namely Threshold 1, is used in the portion of the process performed in steps 404 through 416 to control execution of noncritical tasks separated into two categories based on capacity. However, multiple thresholds may be used in other embodiments, with a corresponding increase in the number of capacity categories.

In step 418, a determination is made as to whether the battery capacity is less than a second threshold, denoted Threshold 2 herein. This second threshold is generally indicative of a minimum acceptable capacity, and may be determined, by way of example, as a capacity which permits voice call capability in the convergence device for a designated period of time. Generally, the portion of the process based on Threshold 2 sets all noncritical tasks to sleeping status if the battery capacity is less than the minimum acceptable capacity, as is shown in steps 418 through 424.

More specifically, if step 418 determines that the battery capacity is less than Threshold 2, the list of noncritical tasks is checked in step 420, and all noncritical tasks on the list are set to sleeping status, as indicated in step 422. Otherwise, if the battery capacity is not less than Threshold 2, all sleeping tasks are set to pending status in step 424. After performance of step 422 or 424, the process returns to step 402, and may be repeated in this manner continuously or at designated predetermined intervals. Once a task is set in the sleeping state, it can only be set to pending if the battery capacity returns again above Threshold 2 in a subsequent iteration of the process.

The thresholds utilized in the above-described process can be determined in a straightforward manner using any number of different techniques.

As one example, in an embodiment in which the power indicator comprises an analog voltage signal, Threshold 1 may be approximately 2.5 volts and Threshold 2 may be approximately 1.5 volts. Of course, these particular values are presented by way of illustrative example only, and other signal values can be used as the thresholds in other embodiments, as appropriate for the particular power source and other device parameters.

As another example, the power indicator may comprise a digital signal, such as a two-bit digital signal, with Threshold 1 being given by a '01' value and Threshold 2 being given by a '10' value. More than two bits may be used in other embodiments. Also, combinations of analog and digital signals may be used to provide a power indicator. As mentioned above, the invention does not require the use of any particular type of power indicator.

The FIG. 4 process is an example of a multi-stage dynamic program throttling process in accordance with the invention. This process as described above utilizes a first threshold to control the substitution of lower-capacity noncritical tasks for higher-capacity noncritical tasks and vice-versa as appropriate, and utilizes a second threshold, lower than the first, to control transition of noncritical tasks between pending and sleeping states. As indicated previously, other embodiments can use different thresholds, task states, and other parameters. Also, processing steps other than those specifically shown in the figure may be used in alternative embodiments.

The dynamic program throttling techniques of the invention provide significant advantages over conventional techniques. For example, the invention in the illustrative embodiments described above provides improved conservation of battery power in a convergence device, thereby ensuring that a user will have access to voice call communication functionality for as long a period of time as is practical under a given set of operating conditions.

The above-described embodiments of the invention are intended to be illustrative only, and numerous alternative embodiments within the scope of the appended claims will be apparent to those skilled in the art. For example, the particular convergence device and processor configurations shown may be altered in other embodiments. Also, as noted above, parameters such as thresholds, noncritical task categories and task states, as well as the arrangement of the associated process steps, may be varied to accommodate the particular needs of a given application.

What is claimed is:

1. A method for conserving power by controlling program execution in a convergence device comprising a power source and at least one processor configured to perform processing operations associated with voice call communication functions and to perform processing operations associated with data communication functions, the processor being operative to execute critical programs and noncritical programs, the method comprising the steps of:

storing for at least a given one of a plurality of noncritical programs associated with the data communication functions an identifier of at least one alternate capacity program performing substantially the same function as the given program but having a different power source capacity associated therewith; and based at least in part on a power indicator representative of a characteristic of the power source, setting at least a subset of the plurality of noncritical programs in one of an executing state, a pending state and a sleeping state; and further based at least in part on the power indicator, replacing execution of the given program which is in the executing state only with execution of the alternate capacity program which is in a pending state, such that an amount of power source capacity utilizable for the voice call communication functions is increased.

2. The method of claim 1 wherein the power source comprises a battery.

3. The method of claim 2 wherein the power indicator is representative of a remaining capacity of the battery.

4. The method of claim 1 wherein if the power indicator is below a first threshold, execution of the given noncritical program is replaced with execution of an alternate capacity noncritical program having associated therewith a lower power source capacity than the given program.

5. The method of claim 4 wherein if the power indicator is below a second threshold that is lower than the first threshold, the given noncritical program and the alternate noncritical program are set to the sleeping status.

6. The method of claim 5 wherein if the power indicator is not below the second threshold, any noncritical program having the sleeping status is set to the pending status.

7. The method of claim 5 wherein the second threshold is representative of a minimum acceptable capacity for continuation of one or more of the voice call communication functions.

8. The method of claim 1 wherein if the power indicator is not below a first threshold, execution of the given noncritical program is replaced with execution of an alternate capacity program having associated therewith a higher power source capacity than the given program.

9. The method of claim 1 wherein the voice call communication functions comprise one or more functions associated with cellular voice call communications.

10. The method of claim 1 wherein the data communication functions comprise one or more functions associated with multimedia processing at one or more of a specified data rate, a specified refresh rate and a specified display resolution.

11. The method of claim 10 wherein the given program performs multimedia processing at a specified data rate and the alternate capacity program performing substantially the same function as the given program performs multimedia processing at a different data rate than the given program.

12. The method of claim 10 wherein the given program performs multimedia processing at a specified refresh rate and the alternate capacity program performing substantially the same function as the given program performs multimedia processing at a different refresh rate than the given program.

13. The method of claim 10 wherein the given program performs multimedia processing at a specified display resolution and the alternate capacity program performing substantially the same function as the given program performs multimedia processing at a different display resolution than the given program.

14. The method of claim 1 wherein the critical programs comprise programs utilized to implement at least one of an operating system running on the processor, a graphical user interface of the convergence device, and one or more of the voice call communication functions.

15. The method of claim 1 wherein the plurality of noncritical programs are categorized based on power source capacity into at least two categories including a category at a first capacity and a category at a second capacity, the first capacity being a lower capacity than the second capacity.

16. The method of claim 1 wherein the processor is operative to store a list of the noncritical programs with associated capacities for one or more of the noncritical programs.

17. The method of claim 1 wherein the processor comprises a multithreaded processor.

18. A convergence device comprising:
a power source; and
at least one processor configured to perform processing operations associated with voice call communication functions and to perform processing operations associated with data communication functions, the processor being operative to execute critical programs and noncritical programs;
the convergence device storing for at least a given one of a plurality of noncritical programs associated with the data communication functions an identifier of at least one alternate capacity program performing substantially the same function as the given program but having a different power source capacity associated therewith;
wherein based at least in part on a power indicator representative of a characteristic of the power source, set at least a subset of the plurality of noncritical programs in one of an executing state, a pending state and a sleeping state; and further based at least in part on the power indicator, execution of the given program which is in the executing state is replaced only with execution of the alternate capacity program which is in the pending state, such that an amount of power source capacity utilizable for the voice call communication functions is increased.

19. An article of manufacture comprising a machine-readable storage medium having embodied thereon program code for use in conserving power by controlling program execution in a convergence device comprising a power source and at least one processor configured to perform processing operations associated with voice call communication functions and to perform processing operations associated with data communication functions, the processor being operative to execute critical programs and noncritical programs, wherein the program code when executed by the processor implements the steps of:
storing for at least a given one of a plurality of noncritical programs associated with the data communication functions an identifier of at least one alternate capacity program performing substantially the same function as the given program but having a different power source capacity associated therewith; and
based at least in part on a power indicator representative of a characteristic of the power source, setting at least a subset of the plurality of noncritical programs in one of an executing state, a pending state and a sleeping state; and further based at least in part on the power indicator, replacing execution of the given program which is in the executing state only with execution of the alternate capacity program which is in the pending state, such that an amount of power source capacity utilizable for the voice call communication functions is increased.

* * * * *